(12) United States Patent
Moore et al.

(10) Patent No.: US 8,438,259 B2
(45) Date of Patent: May 7, 2013

(54) WEB APPLICATION USAGE OF ACCESSORY DEVICE DIRECTLY CONNECTED TO ELECTRONIC DEVICE IN NON-NETWORKED MANNER

(75) Inventors: Keith E. Moore, Sunnyvale, CA (US); Randall Edward Grohs, Star, ID (US); Jeremy Barlow, Boise, ID (US); Shane R. Konsella, Star, ID (US); Michael Hudson, Boise, ID (US); Cooper G. Urie, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 271 days.

(21) Appl. No.: 12/916,514

(22) Filed: Oct. 30, 2010

(65) Prior Publication Data
US 2012/0110151 A1 May 3, 2012

(51) Int. Cl.
*G06F 15/173* (2006.01)
(52) U.S. Cl.
USPC ............................ 709/223; 709/230; 717/168

(58) Field of Classification Search ............... 709/223, 709/230; 717/168
See application file for complete search history.

(56) References Cited

U.S. PATENT DOCUMENTS

| | | | |
|---|---|---|---|
| 7,668,961 B2 | 2/2010 | Lomet | |
| 7,720,906 B2 | 5/2010 | Brockway et al. | |
| 2008/0104044 A1 | 5/2008 | Kardamilas et al. | |
| 2008/0147872 A1 | 6/2008 | Regnier | |
| 2008/0270911 A1 | 10/2008 | Dantwala et al. | |
| 2009/0100352 A1* | 4/2009 | Huang et al. | 715/757 |
| 2009/0307678 A1 | 12/2009 | Wu | |
| 2010/0130253 A1 | 5/2010 | Troster et al. | |

* cited by examiner

*Primary Examiner* — Yves Dalencourt

(57) ABSTRACT

An accessory device is directly connected in a non-networked manner to an electronic device. The accessory device is to be used by a web application running on a computing device connected to the electronic device over a network. The accessory device has a shared context or an owned context. The shared context specifies that usage of the accessory device is shared among the web application and one or more other web applications. The owned context specifies that the usage of the accessory device is exclusive to the web application and not to any other web application.

13 Claims, 10 Drawing Sheets

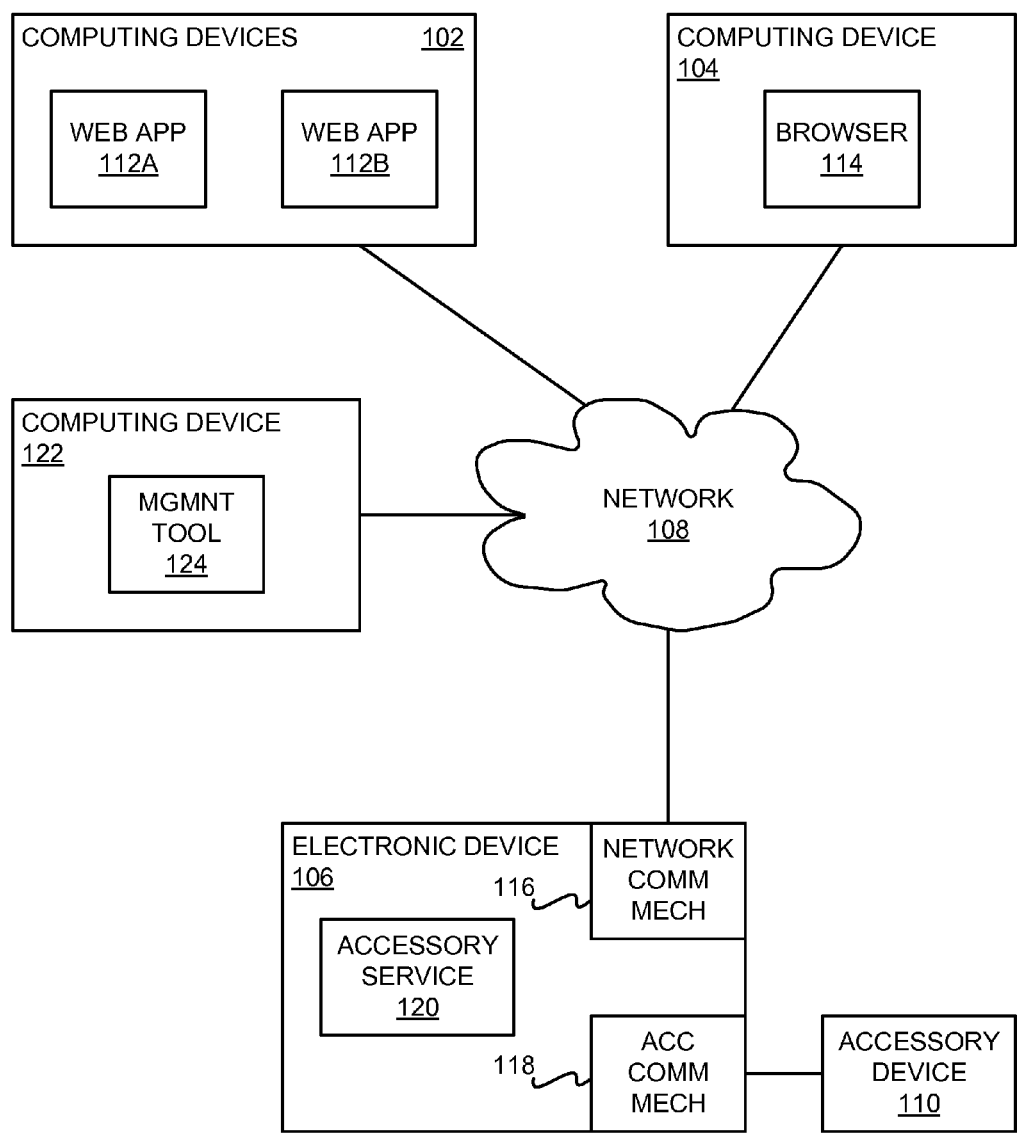

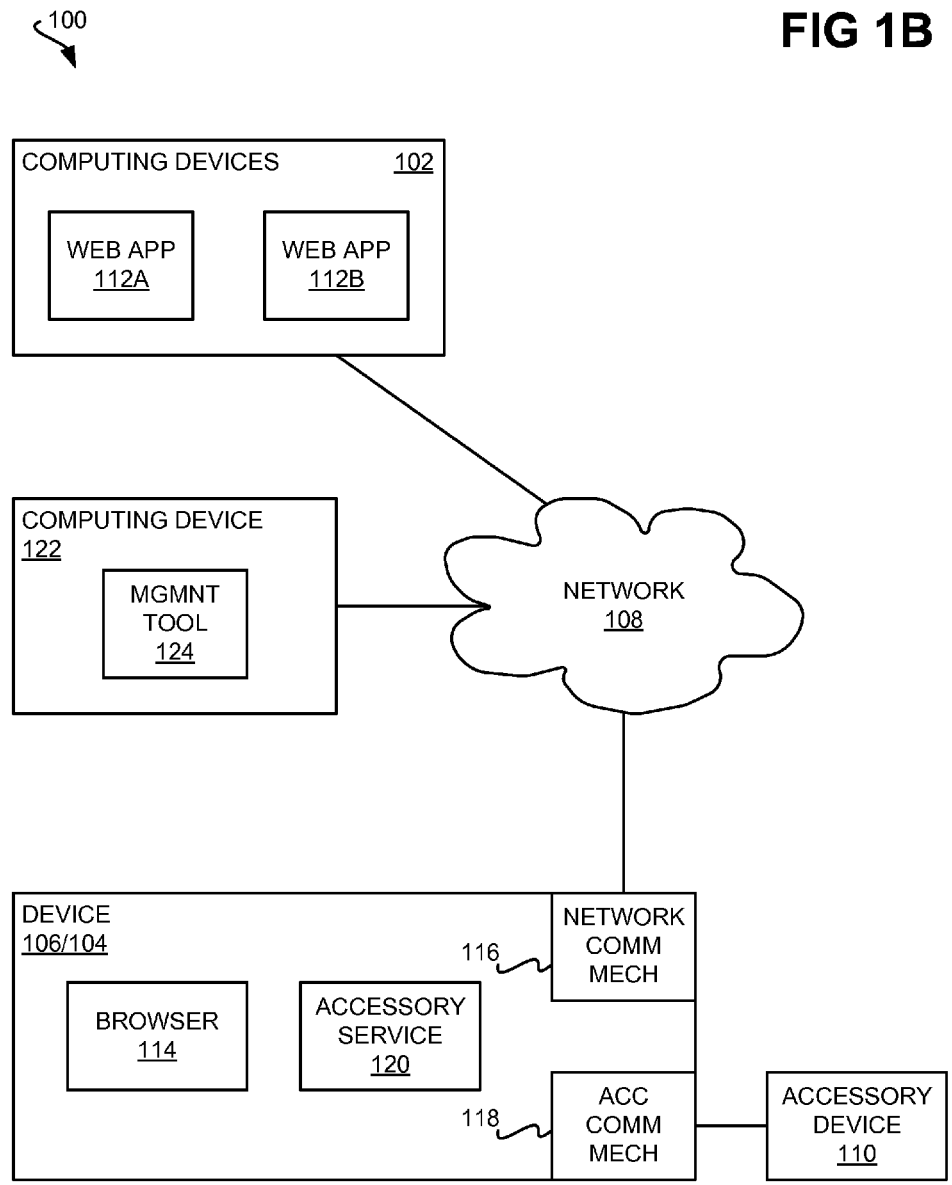

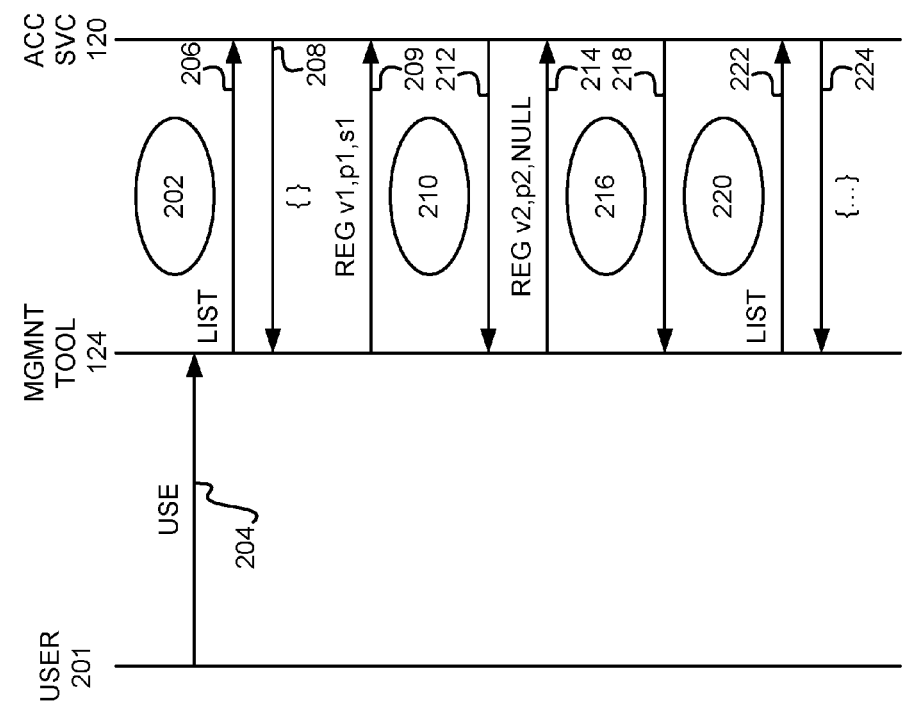

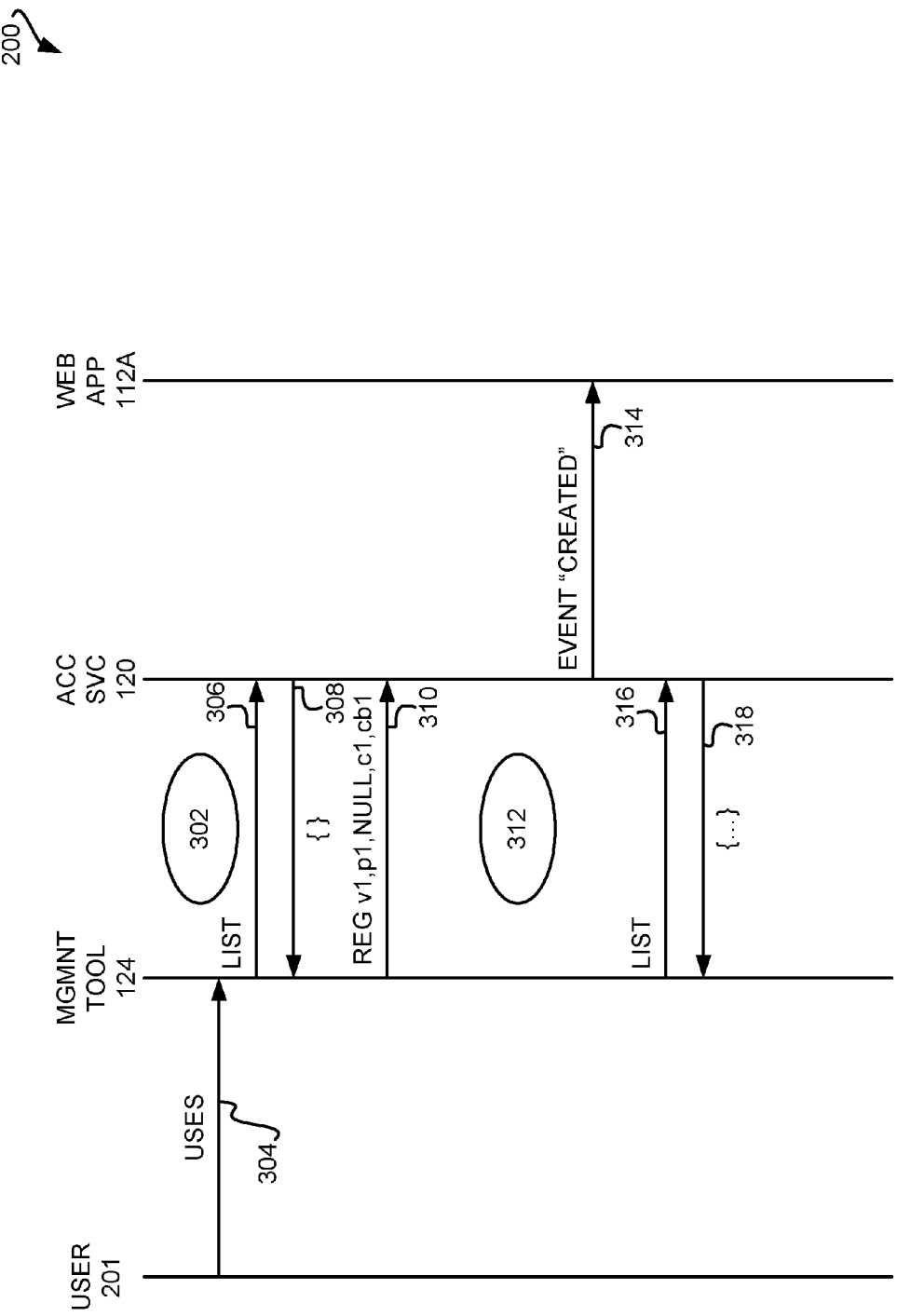

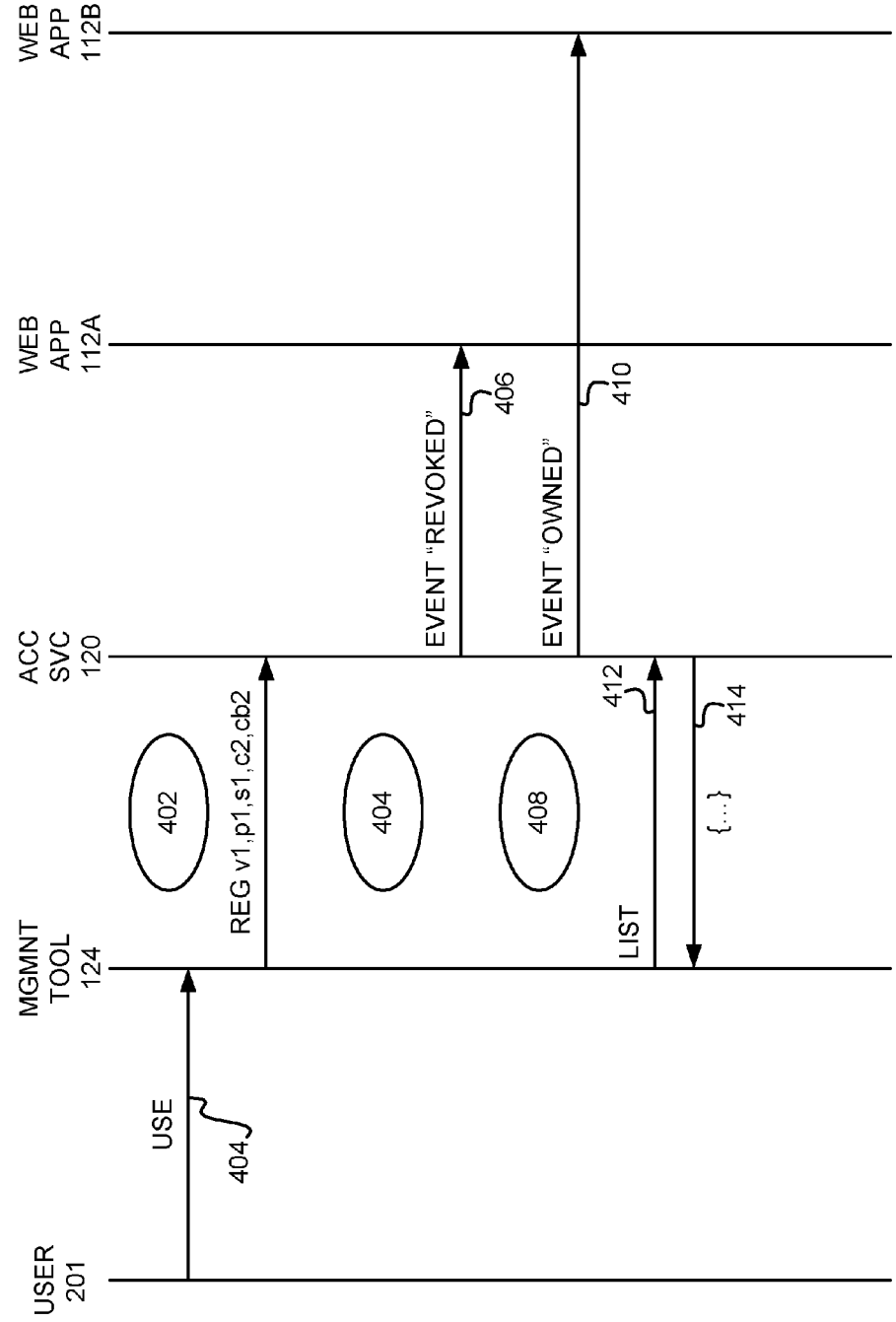

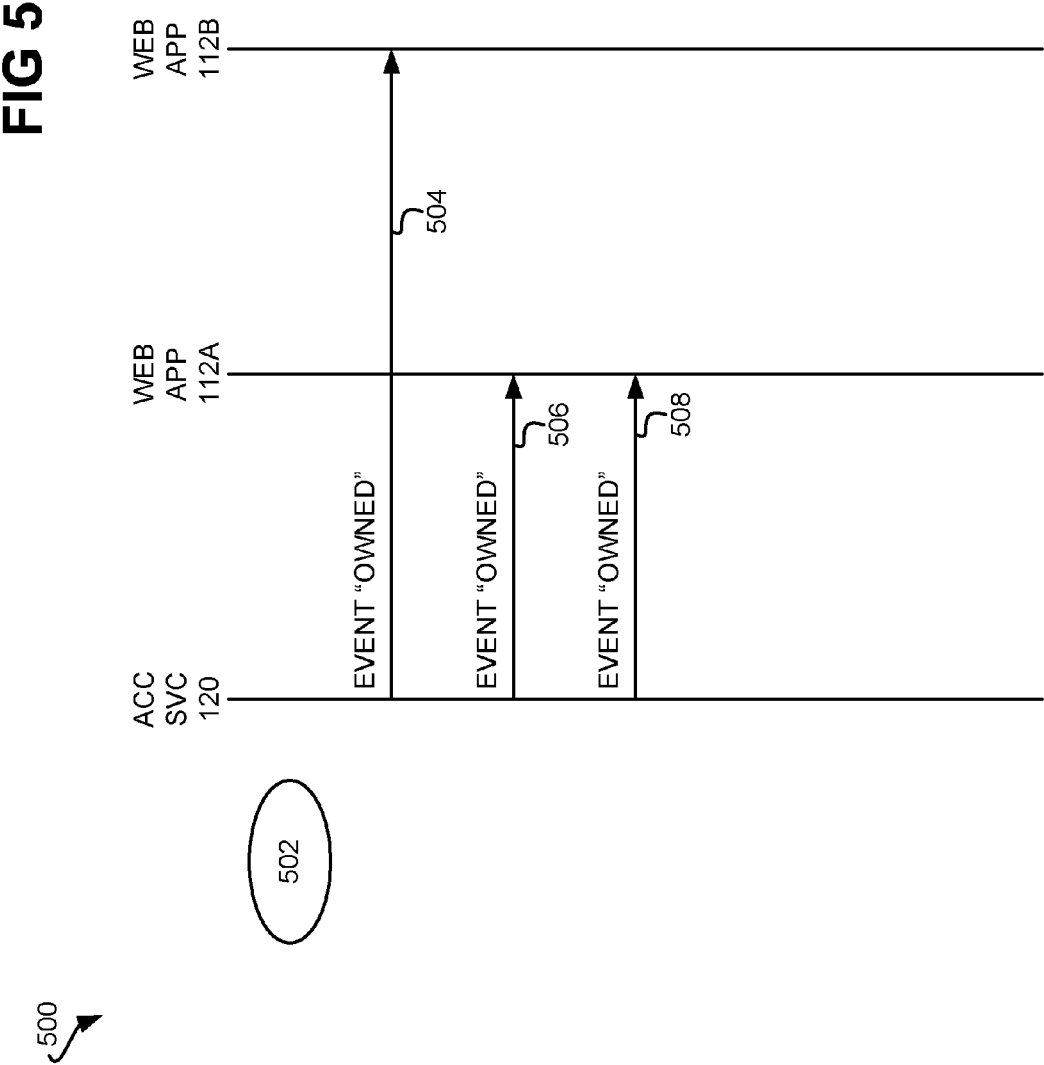

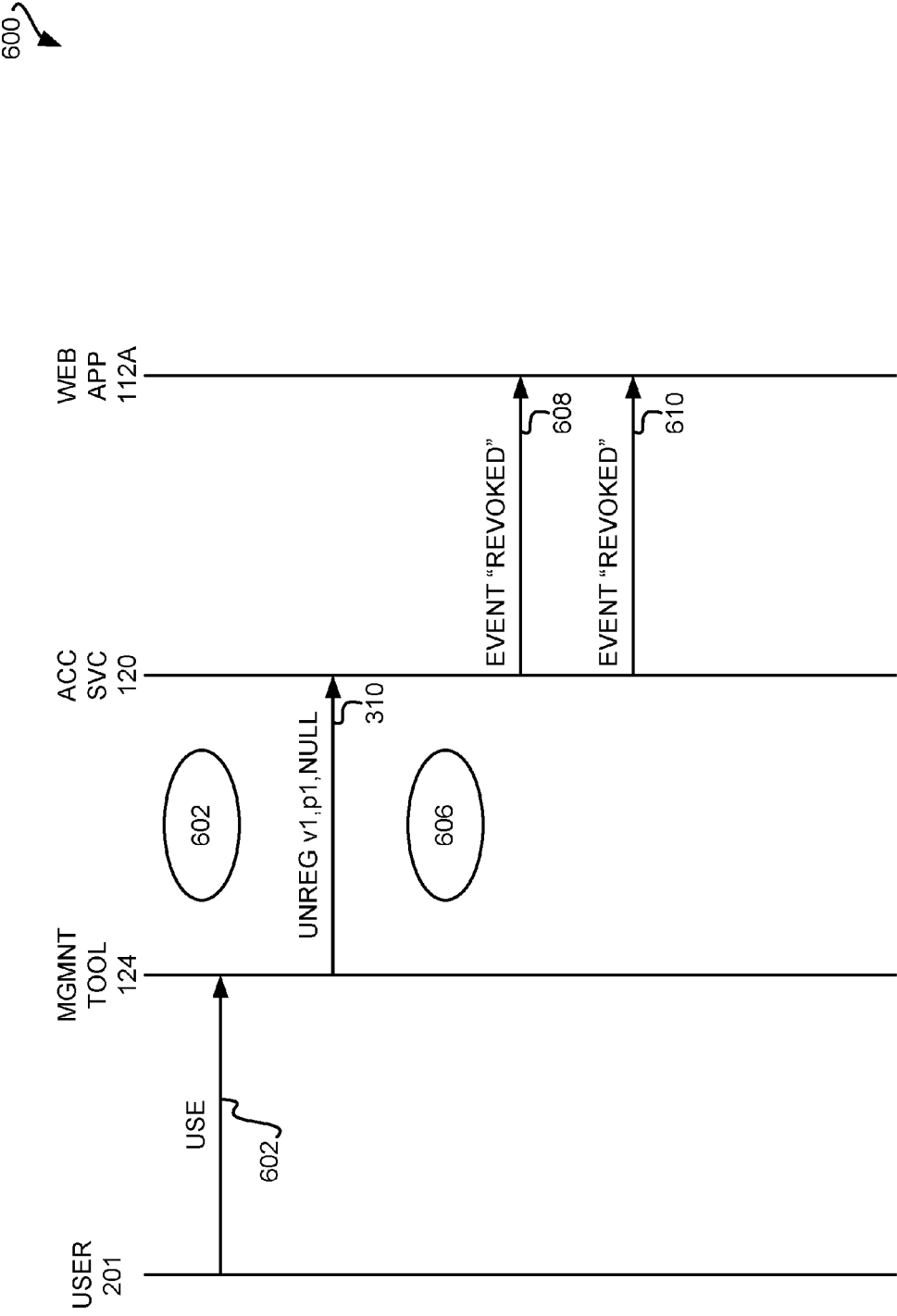

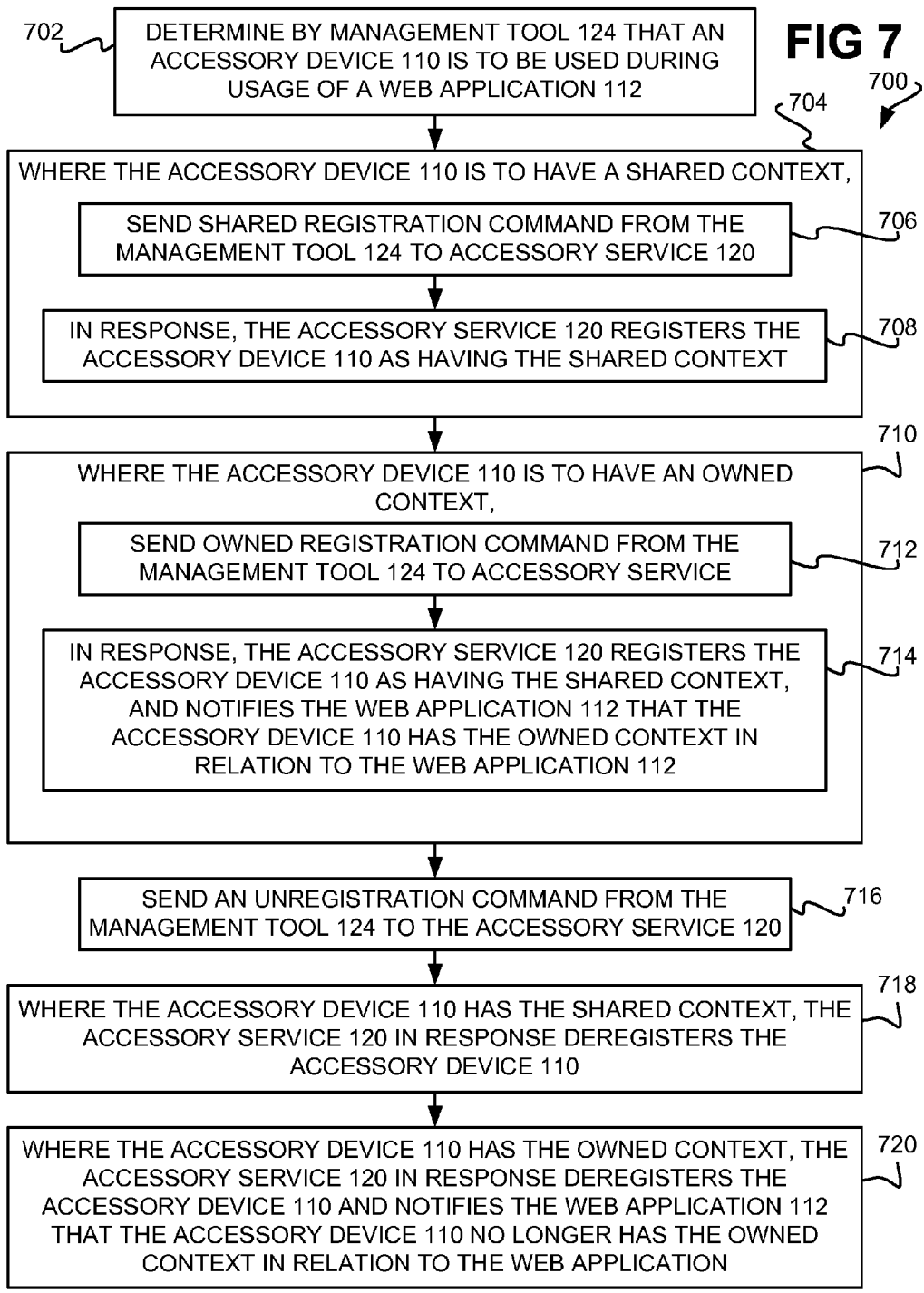

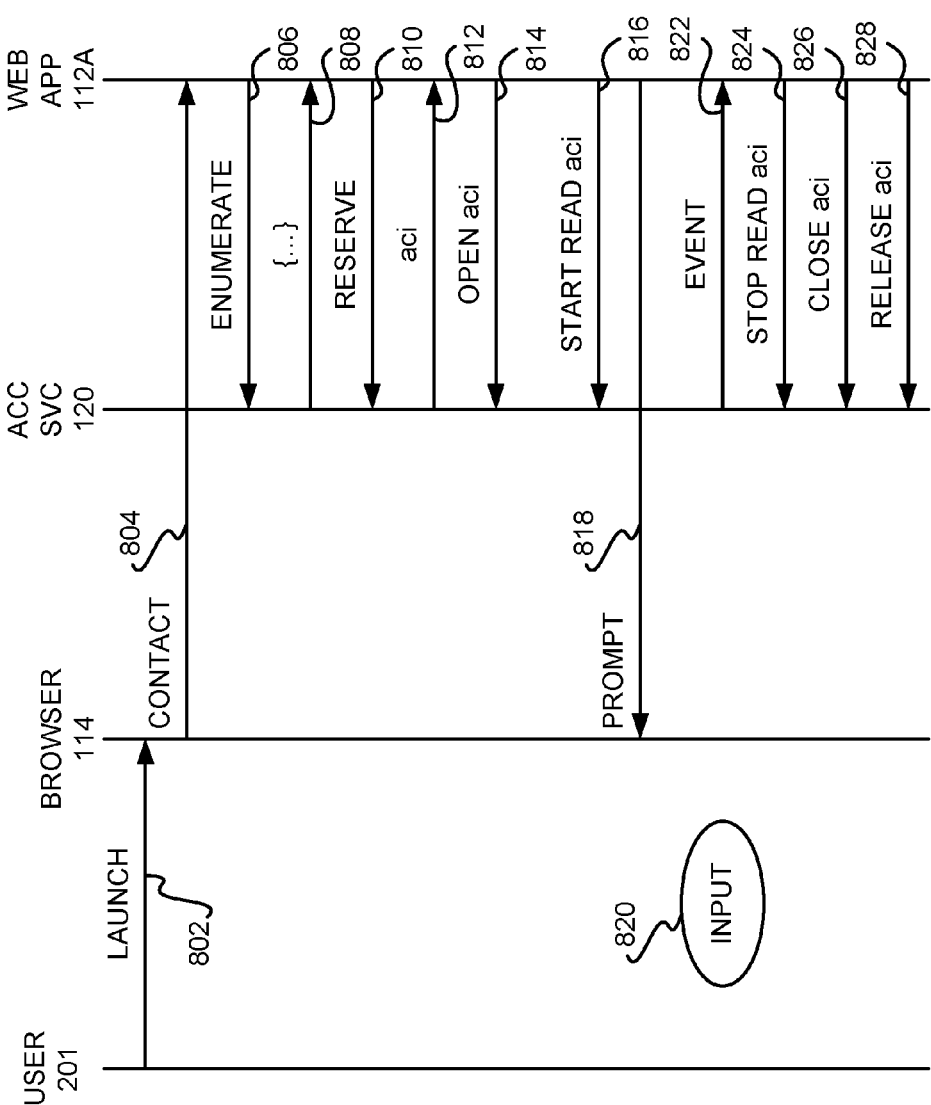

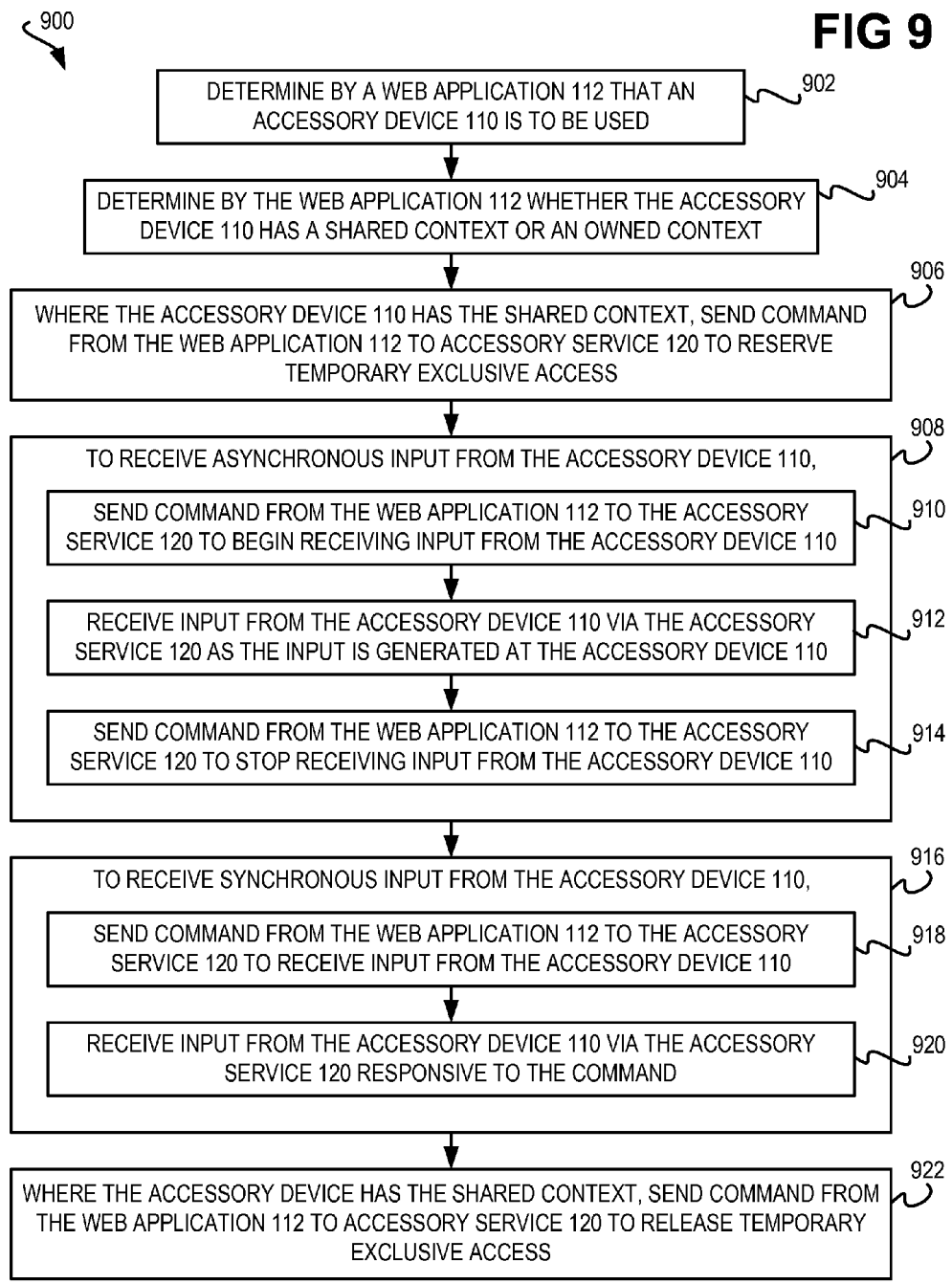

WEB APPLICATION USAGE OF ACCESSORY DEVICE DIRECTLY CONNECTED TO ELECTRONIC DEVICE IN NON-NETWORKED MANNER

BACKGROUND

Web applications are application computer programs that run on a computing device like a server computing device. Users interact with web applications using web browser computer programs that run on another computing device like a client computing device. The computing device on which a web browser computer program is run is connected over a network to the computing device on which a web application is run.

Web applications may permit the users to use functionality of an electronic device. The electronic device may be a multifunction device (MFD) that has printing, scanning, copying, and/or faxing capabilities. The electronic device is connected over the network to the computing device on which a web application is run. The electronic device itself may be directly connected in a non-networked manner to an accessory device like a bar code reader, a fingerprint reader, an identification card reader, and so on.

BRIEF DESCRIPTION OF THE DRAWINGS

FIGS. 1A and 1B are diagrams of a system including an electronic device to which an accessory device is connected in a non-networked manner, according to different examples of the disclosure.

FIG. 2 is an example flow diagram in which commands relating to shared accessory registration records are used during configuration of an accessory device, according to an example of the disclosure.

FIGS. 3, 4, and 5 are example flow diagrams in which commands and/or events relating to owned accessory registration records are used during configuration of an accessory device, according to an example of the disclosure.

FIG. 6 is an example flow diagram in which a command and an event relating to deregistering previously created accessory registration records are used during configuration of an accessory device, according to an example of the disclosure.

FIG. 7 is a flowchart of a method that summarizes configuration of an accessory device, according to an example of the disclosure.

FIG. 8 is an example flow diagram in which commands and events relating to using a previously registered accessory device are used, according to an example of the disclosure.

FIG. 9 is a flowchart of a method that summarizes usage of an accessory device, according to an example of the disclosure.

DETAILED DESCRIPTION

As noted in the background section, a web application is an application computer program that runs on a computing device, and with which a user interacts using a web browser computer program that runs on another computing device. The web application may permit the user to use functionality of an electronic device. The two computing devices and the electronic device are connected to a network. The electronic device may also itself be directly connected in a non-networked manner to an accessory device.

A difficulty encountered by such a web application is how the web application is to receive input from the accessory device. For example, where the electronic device is a multi-function device (MFD) that has copying capabilities, and the accessory device is a fingerprint reader, the web application may not permit a user to use the electronic device to make copies until the user has first authenticated him or herself via the fingerprint reader. However, the web application cannot communicate with the accessory device directly, because the accessory device is not connected to the network, but rather is connected to the electronic device itself in a non-networked manner.

Techniques are disclosed herein for configuring and using an accessory device directly connected to an electronic device in a non-networked manner. The accessory device is configured for use by a web application in a shared context or an owned context. In the shared context, the accessory device is shared among the web application in question and one or more other web applications. By comparison, in the owned context, accessory device is exclusive to the web application and not to any other web application.

An accessory service at the electronic device can provide for configuration and usage of the accessory device. For configuration of the accessory device, the accessory service can communicate with a management computer program running on a computing device connected to the electronic device over the network. The management computer program specifies how the accessory device is to be configured, either in a shared context or an owned context, and the accessory service correspondingly configures the accessory device in this manner.

For usage of the accessory device, the accessory service can communicate with a web service running on a computing device connected to the electronic device over the network. Where the accessory device has the shared context, the accessory service can reserve temporary exclusive access to the accessory device by the web application while the web application is actively running. In both the shared context and the owned context, the accessory service can relay input received from the accessory device to the web application in question.

The remainder of the detailed description is organized as follows. First, a system in which an accessory device directly connected to an electronic device in a non-networked manner can be configured and used by web applications is described. Next, commands and events associated with performing configuration of the accessory device are described, and such description is concluded by presentation of a method summarizing configuration of the accessory device. Finally, commands and events associated with using the accessory device by a web application are described, and such description is also concluded by presentation of a method summarizing usage of the accessory device.

FIGS. 1A and 1B show a system 100, according to different examples of the disclosure. Reference is made herein primarily to FIG. 1A, with explicit reference being made to FIG. 1B where FIG. 1B deviates from FIG. 1A. The system 100 includes one or more computing devices 102, additional computing devices 104 and 122, and an electronic device 106, which are each communicatively connected to a network 108. The network 108 may be or include a wired or a wireless network, an intranet, an extranet, the Internet, a local-area network (LAN), a wide-area network (WAN), and/or another type of network. The system 100 also includes an accessory device 110 directly connected to the electronic device 106 in a non-networked manner.

The computing devices 102 may be server computing devices, and have web applications 112A and 112B, collectively referred to as the web applications 112, running thereon. The computing device 104 may be a client computing device, and has a web browser computer program 114 running thereon. A user at the computing device 104 uses the web applications 112 running on the computing devices 102 by providing input and receiving output at the browser computer program 114, which communicates with the web applications 112. The computing device 104 is depicted as being separate from the electronic device 106. However, the electronic device 106 may alternatively be the computing device 104, such that the browser computer program 114 runs within the electronic device 106. This latter situation is particularly shown in FIG. 1B, in which there is a device 106/104 including the browser computer program 114.

The computing device 122 may also be a client computing device, and has a management tool 124 running thereon. The management tool 124 is a computer program that can be stored on a non-transitory computer-readable data storage medium that is part of or that can be read by the computing device 122. The management tool 124 permits a user to configure the accessory device 110 for use by the web applications 112, as is described in detail below. The computing devices 104 and 122 are depicted as separate computing devices in FIG. 1A, but may alternatively be the same computing device.

The electronic device 106 may itself be a computing device, but may also be another type of electronic device, such as an MFD that has printing, scanning, copying, and/or faxing capabilities. The electronic device 106 has the accessory device 110 directly connected to it in a non-networked manner, such as over a non-networked serial bus like that known as the Universal Serial Bus (USB). The accessory device 110 may be a bar code reader, a fingerprint reader, an identification reader, or another type of accessory device. More than one accessory device 110 may be connected to the electronic device 110.

The electronic device 106 includes a hardware network communication mechanism 116 and a hardware accessory communication mechanism 118. The hardware network communication mechanism 116 permits the electronic device 106 to communicate over the network 108, and may be a network adapter. The hardware accessory communication mechanism 118 permits the electronic device 106 to communicate with the accessory device 110, and may be one or more integrated circuits (IC's) that provide this functionality.

As noted above, more than one accessory device 110 may be able to be connected to the electronic device 106 at the hardware accessory communication mechanism 118. For example, the hardware accessory communication mechanism 118 may have a number of ports to which different accessory devices 110 can be connected. As another example, the hardware accessory communication mechanism 118 may have a port that is receptive to connection to a hub that has a number of ports to which different accessory devices 110 can be connected.

Even when multiple accessory devices 110 are connected to a hub that is connected to the hardware accessory communication mechanism 118, the devices 110 are still said to be directly connected to the electronic device 106 in a non-networked manner. For example, in the context of the USB, multiple accessory devices 110 connected to a hub that is connected to the electronic device 106 still communicate with the device 106 as if they were each connected to a USB port of the device 106. The multiple accessory devices 110 are not networked, in that the devices 110 cannot inherently communicate with one another, but rather can each just inherently communicate directly with the electronic device 106. By comparison, multiple devices that are networked together such as via an Ethernet network can each potentially communicate with one another.

The electronic device 106 further includes an accessory service 120. The accessory service 120 is implemented at least in hardware. For example, the accessory service 120 may be implemented using one or more IC's, such as field-programmable gate arrays (FPGA's), application-specific IC'S (ASIC's), and so on. As another example, the accessory service 120 may be implemented as a computer program that is executed by a processor of the electronic device 106 from a non-transitory computer-readable data storage medium like a hard disk drive, volatile or non-volatile memory, and so on. The processor and the non-transitory computer-readable data storage medium in this case are hardware.

The accessory service 120 provides for configuration of the accessory device 110 for use by the web applications 112. More specifically, the management tool 124 interacts with the accessory service 120 over the network 108 to configure the accessory device 110 for use by the web applications 112. Thereafter, the web applications 112 interact with the accessory service 120 over the network 108 to use the accessory device 110 as previously configured.

The accessory device 110 can have a shared context or an owned context. The shared context specifies that the usage of the accessory device 110 is shared by both the web applications 112. However, just one web application 112 may be able to use the accessory device 110 at any given time. In particular, as is described in more detail below, a web application 112 that is interacting with the web browser computer program 114 in a current session is permitted to temporarily reserve exclusive access to the accessory device 110. When the current session is finished, or when the web application 112 no longer has to have access to the accessory device 110, the temporary exclusive access is revoked. The current session may be identified as an active user interface context identifier.

The owned context specifies that the usage of the accessory device 110 is exclusive to just one web application 112, and not to any other web application 112. The management tool 124 may configure the accessory device 110, for instance, so that the usage of the accessory device 110 is exclusive to just one web application 112, such that the other web application 112 cannot use the device 110. For instance, the other web application 112 cannot temporarily reserve exclusive access to the accessory device 110. The web application 112 that has ownership of the accessory device 110 can use the device 110 regardless of whether the web browser computer program 114 is interacting with the web application 112 in a current session, as is described in more detail below.

As such, the owned context and the shared context of the accessory device 110 differ as follows. First, as described above, the shared context permits usage of the accessory device 110 by any web application 112, whereas the owned context permits exclusive usage of the device 110 by just one web application 112. Second, a web application 112 can use the accessory device 110 in the shared context just when the web browser computer program 114 is interacting with the web application 112 in a current session. By comparison, a web application 112 can use the accessory device 110 in the owned context regardless of whether the browser computer program 114 is interacting with the web application 112 in a current session.

The detailed description continues with a list of commands that are used at least during the configuration of an accessory device 110 by the management tool 124, and examples of such configuration. The commands may also be referred to as methods, as in programming languages like C, Java, and so on. A first such command is the GetSupportedAccessoryClasses( ) command, which is sent to the accessory service 120 in relation to a particular accessory device 110 to determine the type(s) of the accessory device 110. For example, with respect to USB accessory classes, a given accessory device 110 may be a human-interface device (HID), a chip card-interface device (CCID), and so on. Because different types or classes of accessory devices 110 have different capabilities and functionalities, this command permits the capabilities and functionalities of an accessory device 110 to be learned.

Configuration is achieved by the management tool 124 in interaction with the accessory service 120 in relation to registration records. A registration record specifies a type of accessory device 110, such as specifically an individual accessory device 110, or a class of common accessory devices 110. The registration records are maintained by the accessory service 120. The presence of a registration record, however, does not mean that there is a particular accessory device 110 matching the registration record that is currently connected to the electronic device 106. Rather, the presence of a registration record means that there is a type of accessory device 110 that the management tool 124 is interested in configuring for use by the web applications 112, regardless of whether such an accessory device 110 is currently connected to the electronic device 106 or not.

There are two types of registration records: shared accessory registration records and owned accessory registration records. Shared accessory registration records pertain to accessory devices 110 that have shared contexts. Similarly, owned accessory registration records pertain to accessory devices 110 that have owned contexts. Shared accessory registration records are described first, and then owned accessory registration records are described.

A GetSharedAccessoryRecords( ) command is sent to the accessory service 120 to obtain the current list of shared accessory registration records. As noted above, accessory devices 110 that match these registration records may or may not be currently connected to the electronic device 106. The management tool 124 can add a registration record to the list of shared accessory registration records by sending a RegisterSharedAccessory(sharedAccessoryRecord) command. The sharedAccessoryRecord parameter can specify a vendor identifier, a product identifier, and a serial number of a desired accessory device 110.

The vendor identifier uniquely identifies a particular vendor of the desired accessory device 110, whereas the product identifier uniquely identifies the type of product that the desired accessory device 110 is. The serial number uniquely identifies a particular accessory device 110. If the serial number is null, then registration applies to any accessory device 110 that matches the vendor identifier and the product identifier, regardless of the serial number(s) of such device(s) 110. By comparison, if the serial number is not null, then registration applies to a particular accessory device 110 that matches the vendor identifier, the product identifier, and the serial number specified in the RegisterSharedAccessory( ) command.

When this command is received such that the serial number is specified (i.e., not null), if there already exists a registration record that identifies the same vendor identifier, product identifier, and serial number, then the existing registration record is removed, and a new registration record is created in its place. However, a shared registration record specifying a null serial number can coexist with registration records that specify the same vendor and product identifiers but that specify a non-null serial number. In this case, the shared registration record specifying the non-null serial number takes precedence over the registration record specifying the null serial number (but with the same vendor and product identifiers).

It is noted that each time the accessory service 120 receives the RegisterSharedAccessory( ) command, the service 120 enumerates the accessory devices 110 that are currently connected to the electronic device 106. This permits the accessory service 120 to know which currently connected accessory devices 110, if any, match the new shared registration record. Furthermore, the registration records themselves are stored by the accessory service 120 within non-volatile memory of the electronic device 106. As such, the registration records persist even when the electronic device 106 is power-cycled.

FIG. 2 shows an example flow diagram 200 in which the GetSharedAccessoryRecords( ) and the RegisterSharedAccessory( ) commands are used, according to an example of the disclosure. A user 201 communicates with the management tool 124, and the management tool 124 in turn communicates with the accessory service 120. The electronic device 106 is turned on (202), and it is assumed that no accessory devices 110 are connected to the electronic device 106. The user 201 then uses the management tool 124 as follows (204).

First, the management tool 124 sends a GetSharedAccessoryRecords( ) command to the accessory service 120 (206). It is assumed that at first there are no shared accessory registration records maintained by the accessory service 120, such that the service 120 returns an empty list { } back to the management tool 124 (208). The management tool 124 then sends a RegisterSharedAccessory( ) command to the accessory service 120 to register a shared accessory registration record in relation to an accessory device 110 identifiable by a vendor identifier v1, a product identifier p1, and a serial number s1 (209). That is, the sharedAccessoryRecord parameter is (v1,p1,s1).

In response, the accessory service 120 adds a shared accessory registration record having this parameter, and enumerates the accessory devices 110 currently connected to the electronic device 106 to determine whether any such device 110 matches the registration record (210). As noted above, however, there are no accessory devices 110 currently connected to the electronic device 106, and therefore there are no such devices 110 that match the registration record. The accessory service 120 then returns a confirmation message back to the management tool 124 (212).

The management tool 124 sends another RegisterSharedAccessory( ) command to the accessory service 120 to register a shared accessory registration record in relation to accessory devices 110 identifiable by a vendor identifier v1 and a product identifier p1, regardless of serial number (214). As such, the sharedAccessoryRecord parameter is (v2,p2,null). The accessory service 120 adds a shared accessory registration record having this parameter, and enumerates the accessory devices 110 currently connected to the electronic device 106 to determine whether any such device 110 matches the registration record (216). The accessory service 120 then returns a confirmation back to the management tool 124 (218).

The electronic device 106 may then be power-cycled (220). That is, the electronic device 106 may be turned off and back on. Once the electronic device 106 is turned back on, the management tool 124 may send the GetSharedAccessoryRecords( ) command again (222). Because two shared accessory registration records were previously added, and because these records persist even when the electronic device 106 is turned off and then back on, the accessory service 120 sends back a list of these two records (224). Particularly, the accessory service 120 sends back the list {(v1,p1,s1), (v2,p2, null)}.

As noted above, besides shared accessory registration records, there can also be owned accessory registration records. A GetOwnedAccessoryRecords( ) command is sent to the accessory service 120 to obtain the current list of owned accessory registration records. As noted above, accessory devices 110 that match these registration records may or may not be currently connected to the electronic device.

The management tool 124 can add a registration record to the list of owned accessory registration records by sending a RegisterOwnedAccessory(ownedAccessoryRecord) command. The ownedAccessoryRecord parameter can specify a vendor identifier, a product identifier, a serial number, a server context identifier, and a callback reference. The vendor identifier, the product identifier, and the serial number are as have been described above in relation to shared accessory registration records. The server context identifier specifies any information that the web application 112 that is to own the accessory device 110 in question should receive upon the owned accessory registration record being created. Such information may be used by the web application 112 in order to communicate with the accessory device 110. The callback reference specifies the web application 112 that is to own the accessory device 110 in question.

As with shared accessory registration records, an owned accessory registration record that is created using a null serial number applies to any accessory device 110 matching the vendor identifier and the product identifier of the parameter. By comparison, if the serial number is not null, then registration applies to a particular accessory device 110 that matches the vendor identifier, the product identifier, and the serial number specified in the RegisterOwnedAccessory( ) command. When a command is received to create a new owned accessory registration record, if there already exists a registration record (shared or owned) that identifies the same vendor identifier, product identifier, and serial number, then the existing registration record is removed, and the new registration record is created in its place.

Furthermore, owned accessory registration records having non-null serial numbers take precedence over owned accessory registration records with null serial numbers. For example, there may be two accessory devices 110 that have the same vendor and product identifiers v1 and p1, where one accessory device 110 has the serial number s1 and the other accessory device 110 may have the serial number s2. A first owned accessory registration record may pertain to both the accessory devices 110 via (v1,p1,null) and may give ownership to the web application 112A. A second owned accessory registration record may pertain to just the accessory device 110 having the serial number s1 via (v1,p1,s1) and may given ownership to the web application 112B. Because the second record takes precedence over the first record, this means that the accessory device 110 having the serial number s1 is owned by the web application 112B, whereas the accessory device 110 having the serial number s2 is owned by the web application 112A.

When an owned accessory registration record is created, the electronic device 106 enumerates the accessory devices 110 currently connected to the device 106 to identify each device 110 matching the registration record. The web application 112 that is specified by the owned accessory registration record as owning such accessory devices 110 is sent an OwnedAccessoryEvent(ownedAccessoryParam) event, or message, for each such accessory device 110. The ownedAccessoryParam parameter specifies the type of the event (e.g., "created"); the vendor identifier, the product identifier, and the serial number of the accessory device 110 in question; the server context identifier; and, an accessory context identifier. The accessory context identifier is a shorthand manner by which the accessory device 110 is identifiable, instead of using the vendor identifier, the product identifier, and the serial number of the device 110.

An owned accessory registration record with a non-null serial number is registered after an accessory context identifier has been issued because the accessory device 110 in question may match a previously registered owned accessory registration record with a null serial number. In this case, the accessory device 110 in question is revoked from the web application 112 that formerly owned the device 110 before another web application 112 is granted ownership in accordance with the new registration record. Revocation is performed by sending the formerly owning web application 112 an OwnedAccessoryEvent( ) event. The ownedAccessoryParam parameter of this event specifies the type of the event (e.g., "revoked"); the vendor identifier, the product identifier, and the serial number of the accessory device 110 in question; the server context identifier; and, the accessory context identifier previously provided.

As noted above, the registration records are stored by the accessory service 120 within non-volatile memory of the electronic device 106, so that they persist even when the electronic device 106 is power-cycled. Each time the electronic device 106 is turned on, the accessory service 120 enumerates the accessory devices 110 that are currently connected to the electronic device 106. Thereafter, for each accessory device 110 that matches an owned accessory registration record, the accessory service 120 generates a new accessory context identifier and sends an OwnedAccessoryEvent( ) event to the web application 112 that owns the accessory device 110.

FIG. 3 shows an example flow diagram 300 in which the GetOwnedAccessoryRecords( ) and RegisterOwnedAccessory( ) commands and the OwnedAccessoryEvent( ) event are used, according to an example of the disclosure. The user 201 communicates with the management tool 124, and the management tool 124 in turn communicates with the accessory service 120. The accessory service 120 also communicates with the web application 112A.

The electronic device 106 is turned off; an accessory device 110 having a vendor identifier v1, a product identifier p1, and a serial number s1 is connected to the device 106; and, the electronic device 106 is turned back on (302). The user 201 then uses the management tool 124 as follows (304). First, the management tool 124 sends a GetOwnedAccessoryRecords( ) command to the accessory service 120 (306). It is assumed that at first there are no owned accessory registration records maintained by the accessory service 120, such that the service 120 returns an empty list { } back to the management tool 124 (308).

The management tool 124 then sends a RegisterOwnedAccessory( ) command to the accessory service 120 to register an owned accessory registration record in relation to any accessory device 110 identifiable by a vendor identifier v1 and a product identifier p1 (306). The ownedAccessoryRecord parameter thus specifies a serial number of null. The ownedAccessoryRecord parameter may further specify a server context identifier c1, and a callback reference cb1 that identifies the web application 112A. That is, the ownedAccessoryRecord parameter is (v1,p1,null,c1,cb1).

In response, the accessory service 120 enumerates the accessory devices 110 that are currently connected to the electronic device 106, and locates the device 110 having the vendor identifier v1, the product identifier p1, and the serial number s1, which matches the ownedAccessoryRecord parameter (312). That is, the ownedAccessoryRecord parameter specifies any accessory device 110 that has the vendor identifier v1 and the product identifier p1, regardless of serial number, because the serial number within the parameter is specified as null. As such, the accessory device 110 having the vendor identifier v1, the product identifier p1, and the serial number s1 matches this parameter.

As such, the accessory service 120 creates a corresponding owned accessory registration record (312), and sends a corresponding OwnedAccessoryEvent( ) event to the web application 112A (314). The ownedAccessoryParam parameter is ("created",v1,p1,s1,c1,a1). Here, "created" denotes that an owned accessory registration record has been created; v1, p1, and s1 specify the vendor identifier, the product identifier, and the serial number of the accessory device 110 in question; and, c1 is the server context identifier. Furthermore, a1 is the accessory context identifier that is generated by the accessory service 120.

Thereafter, the management tool 124 may again send the GetOwnedAccessoryRecords( ) command to the accessory service 120 (316). One owned accessory registration record has now been created. Therefore, the accessory service 120 returns a list including this registration record back to the management tool 124 (318). Specifically, the list that is sent is {(v1, p1, null, c1, cb1)}.

FIG. 4 shows another example flow diagram 400 in which the GetOwnedAccessoryRecords( ) and RegisterOwnedAccessory( ) commands and the OwnedAccessoryEvent( ) event are used, according to an example of the disclosure. The user 201 communicates with the management tool 124, and the management tool 124 in turn communicates with the accessory service 120. The accessory service 120 also communicates with both the web applications 112. The flow diagram 400 picks up where the flow diagram 300 left off (402).

The user 201 then uses the management tool 124 as follows (404). The management tool 124 sends a RegisterOwnedAccessory( ) command to the accessory service 120 to register an owned accessory registration record in relation to the accessory device 110 identifiable by a vendor identifier v1, a product identifier p1, and a serial number s1 (402). The ownedAccessoryRecord parameter may further specify a server context identifier c2, and a callback reference cb2 that identifies the web application 112B. That is, the ownedAccessoryRecord parameter is (v1, p1, s1, c2, cb2).

In response, the accessory service 120 enumerates the accessory devices 110 that are currently connected to the electronic device 106, and locates the device 110 having the vendor identifier v1, the product identifier p1, and the serial number s1, which matches the ownedAccessoryRecord parameter (404). Furthermore, the accessory service 120 identifies that this accessory device 110 is already subject to an owned accessory registration record that was previously created in part 312 of the flow diagram 300. Therefore, the accessory service 120 revokes the ownership of this accessory device 110 from the web application 112A.

Ownership of the accessory device 110 from web application 112A is revoked because this ownership is pursuant to an owned accessory registration record that pertained to any access device 110 having the vendor identifier v1 and the product identifier p1, regardless of its serial number. As noted above, an owned accessory registration record that specifies a particular serial number takes precedence over an owned accessory registration record that does not. In the present example, the command sent in 402 will result in the creation of an owned accessory registration record that specifies a particular serial number, and thus this registration record takes precedence over the owned accessory registration record that does not specify a particular serial number, and that was created in part 312 of the flow diagram 300.

Ownership revocation is performed by the accessory service 120 sending a corresponding OwnedAccessoryEvent( ) event to the web application 112A (406). The ownedAccessoryParam is ("revoked",v1,p1,s1,c1,a1). Here, "revoked" denotes that ownership of the accessory device 110 has been revoked, where v1, p1, and s1 specify the vendor identifier, the product identifier, and the serial number of the accessory device 110 in question. Furthermore, c1 specifies the server context identifier previously provided to the web application 112A, and a1 is the accessory context identifier that was previously provided to the web application 112A for the accessory device 110.

The accessory service 120 then creates an owned accessory registration record pertaining to the command received in part 402 (408), and sends a corresponding OwnedAccessoryEvent( ) event to the web application 112B (410). The ownedAccessoryParam parameter is ("created",v1,p1,s1,c2, a2). Here, "created" again denotes that an owned accessory registration record has been created; v1, p1, and s1 specify the vendor identifier, the product identifier, and the serial number of the accessory device 110 in question; and, c2 is the server context identifier. Furthermore, a2 is the accessory context identifier that is generated by the accessory service 120.

Thereafter, the management tool 124 may again send the GetOwnedAccessoryRecords( ) command to the accessory service 120 (412). Two owned accessory registration records have now been created, even though just one such registration record is tied to current ownership of the accessory device 110 by a web application 112. This is specifically the owned accessory registration record created in part 408 giving ownership of the accessory device 110 to the web application 112B. The owned accessory registration record created in part 312 of the flow diagram 300 still exists, but it does not given ownership of any accessory device 110 to any web application 112 any longer. The accessory service 120 thus returns a list including both registration records back to the management tool 124 (412). Specifically, the list that is sent is {(v1, p1,null,c1,cb1), (v1,p1,s1,c2,cb2)}.

FIG. 5 shows a third example flow diagram 500 in which the OwnedAccessoryEvent( ) event is used, according to an example of the disclosure. The accessory service 120 communicates with both the web applications 112. The flow diagram 500 picks up where the flow diagram 400 left off (502). Specifically, the electronic device 106 is turned off, two more accessory devices 110 are connected to the device 106, and then the device 106 is turned back on (502). Both of these accessory devices 110 have the vendor identifier v1 and the product identifier p1, where the first additional accessory device 110 has the serial number s2 and the second additional accessory device 110 has the serial number s3. It is noted that the accessory device 110 having the vendor identifier v1, the product identifier p1, and the serial number s1 remains connected to the electronic device 106.

The accessory service 120 enumerates these three accessory devices 110 connected to the electronic device 106, and determines whether the previously two created owned accessory registration records match each device 110 (502). As before, the owned accessory registration record created in part 404 of the flow diagram 400 matches the accessory device 110 having the vendor identifier v1, the product identifier p1, and the serial number s1. Therefore, the accessory service 120 generates a new accessory context identifier a3, and sends a corresponding OwnedAccessoryEvent( ) event to the web application 112B for this accessory device 110 (504).

The ownedAccessoryParam parameter sent in the OwnedAccessoryEvent( ) event in part 504 is ("created",v1,p1,s1, c2,a3). As before, "created" denotes that an owned accessory registration record was created; v1, p1, and s1 specify the vendor identifier, the product identifier, and the serial number of the accessory device 110 in question; and, c2 is the server context identifier. It is noted, however, that the accessory context identifier a3 is different than that previously generated and sent in part 410 of the flow diagram 400. This is because each time an OwnedAccessoryEvent( ) is sent for a created owned accessory registration record, a new accessory context identifier is generated and sent.

Furthermore, the owned accessory registration record created in part 312 of the flow diagram 300 matches the two newly connected accessory devices 110 having the vendor identifier v1 and the product identifier p1. For the accessory device 110 having the serial number s2, the accessory service 120 generates a new accessory context identifier a4, and sends a corresponding OwnedAccessoryEvent( ) event to the web application 112A (506). Likewise, for the accessory device 110 having the serial number s3, the accessory service 120 generates a new accessory context identifier a5, and sends a corresponding OwnedAccessoryEvent( ) event to the web application 112B (508).

The ownedAccessoryParam parameter sent in the OwnedAccessoryEvent( ) event in part 506 is ("created",v1,p1,s2, c1,a4), and the ownedAccessoryParam parameter sent in the OwnedAccessoryEvent( ) event in part 508 is ("created",v1, p1,s3,c1,a5). As before, "created" denotes that an owned accessory registration record was created; v1, p1, and s2, and v1, p1, and s3, each specify the vendor identifier, the product identifier, and the serial number of the accessory device 110 in question; and c1 is the server context identifier. Furthermore, a4 and a5 are each an accessory context identifier.

The registration of both owned and shared accessory devices 110 has been described. Such registration is part of the configuration of the accessory devices 110, using the management tool 124, so that the accessory devices 110 can be used by the web applications 112. A user using the management tool 124 may also want to deregister previously registered accessory devices 110 during configuration, however.

An UnregisterAccessory(unregisterAccessoryParam) command can thus be sent to the accessory service 120 to deregister one or more accessory devices 110 that match the unregisterAccessoryParam parameter. The unregisterAccessoryParam parameter can specify a vendor identifier, a product identifier, and a serial number. If the serial number is not null, then this parameter specifies at most one currently registered accessory device 110, specifically the device 110 having the specified vendor identifier, product identifier, and serial number. If the serial number is null, then this parameter can specify more than one accessory device 110, specifically any device 110 having the specified vendor identifier and product identifier. It is noted that if no accessory device 110 matches the unregisterAccessoryParam parameter, than this command has no effect, except to remove the registration record.

When the accessory service 120 receives the UnregisterAccessory( ) command, the service removes any matching registration records that match the unregisterAccessoryParam parameter. Such registration records can include shared registration records and/or owned registration records. The accessory service 120 then enumerates the accessory devices 110 currently connected to the device 106 to identify each device 110, if any, that matches the unregisterAccessoryParam parameter.

For any such accessory device 110 that is currently owned by a web application 112, the accessory service 120 revokes the ownership of the accessory device 110 from the web application 112 in question. Revocation is performed by sending the currently owning web application 112 an OwnedAccessoryEvent( ) event. The ownedAccessoryParam parameter of this event specifies the type of the event (e.g., "revoked"); the vendor identifier, the product identifier, and the serial number of the accessory device 110 in question; the server context identifier; and, the accessory context identifier previously provided.

FIG. 6 shows an example flow diagram 600 in which the UnregisterAccessory( ) command and the OwnedAccessoryEvent( ) event are used, according to an example of the disclosure. The user 201 communicates with the management tool 124, and the management tool 124 communicates with the accessory service 120. The accessory service 120 communicates with the web application 112A.

The flow diagram 600 picks up where the flow diagram 500 left off (602). The user 601 uses the management tool 124 as follows (601). The management tool 124 sends an UnregisterAccessory( ) command to the accessory service 120 to deregister any accessory devices 110 identifiable by a vendor identifier v1 and a product identifier p1 (604). As such, the serial number is set to null within the unregisterAccessoryParam parameter.

In response, the accessory service 120 deletes the owned accessory registration record created in part 312 of the flow diagram 300 that includes the vendor identifier v1, the product identifier p1, and the serial number null (606). In part 506 and part 508 of the flow diagram 500, the web application 112A was previously sent OwnedAccessoryEvent( ) events to notify the web application 112A that it had ownership of the two accessory devices 110 identified by this now-deleted registration record. These two accessory devices 110 both have the vendor identifier v1 and the product identifier p1; one of these devices 110 has the serial number s2, and the other device 110 has the serial number s3.

Therefore, the accessory service 120 sends an OwnedAccessoryEvent( ) event to the web application 112A to revoke ownership of the accessory device 110 having the vendor identifier v1, the product identifier p1, and the serial number s2 (608). The accessory service also sends an OwnedAccessoryEvent( ) event to the web application 112A to revoke ownership of the accessory device 110 having the vendor identifier v1, the product identifier p1, and the serial number s3 (610). The ownedAccessoryParam parameter sent in the event in part 608 is ("revoked",v1,p1,s2,c1,a4), and the ownedAccessoryParam parameter sent in the event in part 610 is ("revoked",v1,p1,s3,c1,a5). As before, "revoked" denotes that ownership has been revoked; v1, p1, and s2, and v1, p1, and s3, each specify the vendor identifier, the product identifier, and the serial number of the accessory device 110 in question; and c1 is the server context identifier. Furthermore, a4 and a5 are accessory context identifiers.

FIG. 7 shows a method 700 that summarizes the prior description for configuring an accessory device 110, according to an example of the disclosure. As with other methods disclosed herein, the method 700 can be implemented as one or more computer programs stored on non-transitory computer-readable data storage medium. Examples of such computer-readable media include volatile and non-volatile magnetic, optical, and semiconductor media.

A user at the management tool 124 determines that an accessory device 110 is to be used during usage of a web application 112 (702). It is noted that the accessory device 110 may or may not be currently connected to the electronic device 106. The user at the management tool 124 determines whether the accessory device 110 is to have a shared context or an owned context.

Where the accessory device 110 is to have a shared context (704), the management tool 124 sends a shared registration command to the accessory service 120 of the electronic device 106 (706). For instance, the management tool 124 can send the RegisterSharedAccessory( ) command that has been described. In response, the accessory service 120 registers the accessory device 110 as having the shared context (708), as specified within the command. For instance, the accessory service 120 can create a shared accessory registration record, as has been described.

Where the accessory device 110 is to have an owned context in relation to a particular web application 112 (710), the management tool 124 sends an owned registration command to the accessory service 120 of the electronic device 106 (712). For instance, the management tool 124 can send the RegisterOwnedAccessory( ) command that has been described. In response, the accessory service 120 registers the accessory device as having the owned context in relation to the web application 112 in question, and notifies this web application 112 that the accessory device 110 has this owned context (714). For instance, the accessory service 120 can create an owned accessory registration record, as has been described, and can send an appropriate OwnedAccessoryEvent( ) to the web application 112, as has also been described.

For each of the shared registration command and the owned registration command, the parameters for the registration command can specify a class of accessory devices 110 including a particular accessory device 110, or can specify just a particular accessory device 110. As described above, the former can be achieved by specifying just the vendor identifier and the product identifier, where more than one accessory device 110 may have such vendor and product identifiers. As also described above, the latter can be achieved by specifying the serial number of a particular accessory device 110 in addition to its vendor and product identifiers.

In the case of shared registration commands, a shared registration command pertaining to a class of accessory devices is overruled by any prior or subsequent shared registration command pertaining to a particular accessory device within this class. The same is true in the case of owned registration commands. An owned registration command pertaining to a particular accessory device within a class of accessory devices overrules any prior or subsequent shared or owned registration command pertaining to the entire class of accessory devices. A registration command pertains to a class of accessory devices when specifying a null serial number, and pertains to a particular accessory device when specifying a non-null serial number.

Configuration can also include the management tool 124 sending the accessory service 120 of the electronic device 106 an unregistration command as to the accessory device 110 that was previously registered (716). Where the accessory device 110 has the shared context, the accessory service 120 in response deregisters the accessory device 110 (718). For instance, the accessory service 120 can delete the previously created shared accessory registration record, as has been described.

Where the accessory device 110 has the owned context, the accessory service 120 in response deregisters the accessory device 110 and notifies the owning web application 112 that the accessory device 110 no longer has the owned context in relation to this web application 112 (720). For instance, the accessory service 120 can delete the previously created owned accessory registration record, as has been described. The accessory service 120 can then send an appropriate OwnedAccessoryEvent( ) to the web application 112 in question, as has also been described.

The detailed description continues next with a list of commands that are used at least during the usage of an accessory device 110 by a web application 112, as well as with examples of such usage. The commands may also be referred to as methods, as in programming languages like C, Java, and so on. The usage of an accessory device 110 by a web application 112 presumes that an appropriate shared or owned registration record has been previously created during configuration, so that the accessory device 110 is shared with or is owned by the web application 112.

A first command is the EnumerateAccessories( ) command, which is sent to the accessory service 120 to obtain a list of all the registered accessory devices 110 currently connected to the electronic device 106. A web application 112 can then search this list for shared accessory devices 110 that it recognizes and knows how to use. As to accessory devices 110 that the web application 112 owns, the web application 112 is already aware of such devices 110, due to corresponding events having been sent to the web application 112 during configuration.

A web application 112 that is currently interacting with the web browser computer program 114 in a current session is permitted to temporarily reserve exclusive access to a shared accessory device 110. Otherwise, the web application 112 is not permitted to use a shared accessory device 110. To use a shared accessory device when the web application 112 is in a current session, the web application first obtains the accessory context identifier of a desired shared accessory device 110. By obtaining the accessory context of this accessory device 110, the web application 112 has temporarily exclusive access to the accessory device 110.

Therefore, the web application 112 sends to the accessory service 120 a ReserveSharedAccessoryContext(reserveParam) command. The reserveParam parameter specifies a user interface context identifier of the current session that the web application 112 has with the web browser computer program 114. The reserveParam parameter further specifies a vendor identifier, a product identifier, and a serial number of the desired shared accessory device. In return, the accessory service 120 sends the web application 112 the accessory context identifier of the shared accessory device 110 having the specified vendor identifier, product identifier, and serial number.

It is noted that it is desirable for the web application 112 to release its temporary exclusive access to the accessory device 110 once the web application 112 is finished using the device 110. To accomplish this, the web application 112 sends the accessory service 120 a ReleaseSharedAccessoryContext (accessoryContextId) command. The accessoryContextId parameter specifies the accessory context identifier of the accessory device 110. In response, the accessory service 120 releases the temporary exclusive access to the accessory device 110 by the web application 112.

A web application 112 is further permitted to use an accessory device 110 to which the web application 112 has ownership, regardless of whether the web application 112 is currently in an active session with the web browser computer program 114 or not. The web application 112 automatically receives the accessory context identifier of an owned accessory device 110 when the accessory device 110 is registered with an owned context in relation to the web application 112, even if the web application 112 does not have a current user interface context identifier. However, because there is no guarantee that the web application 112 may have actually received this accessory context identifier, the web application 112 can request that the accessory context identifier of a desired owned accessory device 110 be resent by the accessory service 1120.

To achieve this, the web application 112 sends the accessory service 120 a ResendOwnedAccessoryEvent(resendOwnedParam) command. The resendOwnedParam parameter specifies the vendor identifier, product identifier, and serial number of an owned accessory device 110. In response, the accessory service 120 sends back to the web application 112 the accessory context identifier of the accessory device 110 in question. A web application 112 may further send this command periodically to refresh the accessory context identifier that the web application 112 has for a given owned accessory device 110.

To use an accessory device 110 for which the web application 112 has an accessory context identifier, be the accessory device 110 a shared device 110 or an owned device 110, the web application opens the accessory device 110. This is accomplished by sending an appropriate command to the accessory service 120. The following description pertains to such usage commands in relation to an accessory device 110 that is a HID. However, comparable usage commands may be provided in relation to an accessory device 110 that is a CCID, or another type or kind of accessory device 110.

The web application 112 calls a HID accessory device 110 by sending a HidOpen(accessoryContextId) command to the accessory service 120. The accessoryContextId parameter specifies the accessory context identifier of the HID accessory device 110. The web application 112 may further obtain the report length and status of the HID accessory device 110, which are used when actually receiving input from the device 110. To achieve this, the web application 112 sends to the accessory service 120 a HidGetInfo(accessoryContextId) command after the HID accessory device 110 in question has been opened. As before, the accessoryContextId parameter specifies the accessory context identifier of the HID accessory device 110.

The web application 112 uses a HID accessory device 110 by receiving input from the device 110. Such input can be received asynchronously or synchronously. Asynchronous input means that when the HID accessory device 110 generates or receives input, the input is automatically and immediately sent to the web application 112. Synchronous input means that the web application 112 is not sent the input from the HID accessory device 110 until the web application 112 specifically requests the input.

For asynchronous input, the web application 112 sends the accessory service 120 a HidStartReading(hidStartParam) command. The hidStartParam parameter specifies the accessory context identifier of the HID accessory device 110 in question. The hidStartParam parameter also specifies a server context identifier, which is the information previously sent to the web application 112 when a registration record for the accessory device 110 was created. The hidStartParam parameter further specifies a callback reference, which identifies the web application 112 itself as the recipient of the input generated or received by the accessory device 110 in question.

Once the web application 112 has started reading the HID accessory device 110 by sending the aforementioned command, the web application 112 can receive input from this accessory device 110 via events received from the accessory service 120. However, it is not guaranteed that the web application 112 will receive such input, if no input is generated at the accessory device 110. Input is sent from the accessory service 120 to the web application 112 via a HidReportEvent (ordinal, payload) event. The ordinal parameter is set to one with the first HidReportEvent( ) event sent by the accessory service 120 after the HidStartReading( ) command is sent by the web application 112, and is incremented by one with each additional HidReportEvent( ) sent thereafter. The payload parameter is the actual input generated at or received by the HID accessory device 110.

When the web application 112 is finished with receiving input from the HID accessory device 110 via the accessory service 120, the web application 112 sends the accessory service 120 a HidStopReading(accessoryContextId) command. The accessoryContextId parameter specifies the accessory context identifier of the HID accessory device 110. Once the HidStopReading( ) command is received by the accessory service 120, the accessory service 120 no longer sends any HidReportEvent( ) events to the web application 112. It is noted that if the web application 112 begins reading the HID accessory device 110 again by sending another HidStartReading( ) command, the ordinal parameter is reinitialized to one.

For synchronous input, the web application 112 sends the accessory service 120 a HidReadReport(accessoryContextId, reportType) command. The accessoryContextId parameter specifies the accessory context identifier of the desired HID accessory device 110. The reportType parameter specifies the type of input that the web application 112 wishes to receive, if the accessory device 110 in question is able to provide different types of input. In response to the receiving this command, the accessory service 120 sends the web application a return HidReportEvent( ) event, where the ordinal parameter may be set to null or zero. It is noted that the web application 112 can send the accessory service 120 HidReadReport( ) commands to receive synchronous input from the accessory device 110 at the same time that the web application 112 is receiving asynchronous input from the accessory device 110.

The web application 112 can also synchronously send output to a desired HID accessory device 110 by sending the accessory service 120 a HidWriteReport(accessoryContextId, reportType, payload) command. The accessoryContextId parameter specifies the accessory context identifier of the desired HID accessory device 110. The reportType parameter specifies the type of output that the web application 112 is sending, if the accessory device 110 in question is able to accommodate different types of output. The payload parameter specifies the actual data or information that the web application 112 is sending to the HID accessory device 110.

Once a web application 112 is finished with a HID accessory device 110, the web application 112 should close the HID accessory device 110 by sending a HidClose(accessoryContextId) command to the accessory service 120. The accessoryContextId parameter specifies the accessory context identifier of the HID accessory device 110. It is noted that if the web application 112 received asynchronous input from the HID accessory device 110, the web application should not close the accessory device 110 until after the web application 112 has sent the HidStopReading( ) command.

FIG. 8 shows an example flow diagram 800 in which some of the usage-related commands that have been described are used, according to an example of the disclosure. A user 201 launches the web browser computer program 114 (802), which in turn contacts the web application 112A (804). The web application 112A sends the EnumerateAccessories( )

command to the accessory service 120 (806), and in return the accessory service 120 sends a list of the registered accessory devices 110 currently connected to the electronic device 106 (808). For example, the list may include (v1, p1, s1, Hid, false), which specifies an accessory device 110 that has a vendor identifier v1, a product identifier p1, a serial identifier s1, and is of the type Hid (i.e., the accessory device 110 is a HID). The false flag indicates that the accessory device 110 is shared, whereas a true flag indicates that the accessory device 110 is owned.

The web application 112A then reserves temporary exclusive access to this shared accessory device 110, by sending the accessory service 120 the ReserveSharedAccessoryContext(reserveParam) command (810). The reserveParam parameter specifies the user interface context identifier of the current session that the web application 112A has with the web browser computer program 114 as launched by the user 201 in part 802. The reserveParam parameter also specifies the vendor identifier v1, the product identifier p1, and the serial number s1 of the accessory device 110. In return, the accessory service 120 sends the web application 112A the accessory context identifier aci of the accessory device 110 (812).

The web application 112A then opens the accessory device 110, by sending the accessory service 120 the HidOpen(accessoryContextId) command (814), where the accessoryContextId parameter is equal to aci. The web application 112A can then start asynchronously reading the accessory device 110. That is, the web application 112A can begin asynchronously receiving input from the accessory device 110. This is accomplished by the web application 112A sending the accessory service 120 the HidStartReading(hidStartParam) command, where the hidStartParam is equal to the accessory context identifier aci of the accessory device 110.

As depicted in FIG. 8, the web application 112A may prompt the user 201 via the web browser computer program 114 to begin using the accessory device 110 (818). The user 201 uses the accessory device 110 to generate input at the device 110 (820). In response, the accessory service 120 sends an event to the web application 112A that includes this input (822). Particularly, the accessory service 120 sends the web application 112A one or more HidReportEvent( ) events.

Once the web application 112A has received sufficient input from the accessory device 110, the web application 112A stops reading the device 110 by sending the accessory service 120 the HidStopReading( ) command specifying the accessory context identifier aci of the device 110 (824). The web application 112A then closes the accessory device 110 by sending the accessory service 120 the HidClose( ) command specifying the accessory context identifier aci of the device 110 (826). Finally, the web application 112A releases its temporary exclusive access of the accessory device 110 by sending the accessory service 120 the ReleaseSharedAccessoryContext( ) command specifying the accessory context identifier of the device 110 (828).

FIG. 9 shows a method 900 that summarizes the prior description for using an accessory device 110 after the device 110 has been configured, according to an example of the disclosure. A web application 112 determines that an accessory device 110 is to be used (902). For example, the web application 112 may know the identity of this accessory device 110 due to the accessory device 110 having been previously registered with an owned context in relation to the web application 112. As another example, the web application 112 may know the identity of the accessory device 110 after having sent the EnumerateAccessories( ) command to the accessory service 120, as has been described.

The web application 112 determines whether the accessory device 110 has a shared context or an owned context (904). For instance, if the web application 112 previously received an event from the accessory service 120 that the web application 112 owns the accessory device 110, then the web application 112 concludes that the accessory device 110 has the owned context. Otherwise, if the web application 112 just learned of the accessory device 110 via the EnumerateAccessories( ) command, then the web application 112 concludes that the accessory device 110 has the shared context. If the accessory device 110 has the shared context, then the web application 112 sends a command to the accessory service 120 to reserve temporary exclusive access of the device 110 (906), such as via the ReserveSharedAccessoryContext( ) command that has been described.

Regardless of whether the accessory device 110 has the shared context or the owned context, the web application 112 can receive asynchronous input from the accessory device 110 as follows (908). The web application 112 sends one or more commands to the accessory service 120 to begin receiving asynchronous input from the accessory device 110 (910). For instance, the web application 112 may send a HidOpen( ) command and then a HidStartReading( ) command to the accessory service 120, as has been described. The web application 112 may further send a HidGetInfo( ) command to the accessory service 120, as has also been described.

The web application 112 asynchronously receives input from the accessory device 110 via (i.e., through) the accessory service 120 as this input is generated at the accessory device 110 (912), such as via HidReportEvent( ) events as have been described. When the web application 112 is finished receiving asynchronous input from the accessory device 110, the web application 112 sends the accessory device 110 one or more commands to stop receiving asynchronous input from the accessory device 110 (914). For instance, the web application 112 may send a HidStopReading( ) command and a HidClose( ) command to the accessory service 120, as has been described.

Furthermore, regardless of whether the accessory device 110 has the shared context or the owned context, the web application 112 can receive synchronous input from the accessory device 110 as follows (916). The web application 112 sends a command to the accessory service 120 to receive synchronous input from the accessory device 110 (910), such as the HidReadReport( ) command. In response to this command, the web application 112 receives input from the accessory device 110 via (i.e., through) the accessory service (920), such as via HidReportEvent( ) events as have been described.

When the web application 112 is finished receiving input from the accessory device 110, and where the accessory device 110 has the shared context, the web application 112 sends a command to the accessory service 120 to release its temporary exclusive access of the device 110 (922). For instance, the web application may send the ReleaseSharedAccessoryContext( ) command. In this way, then, the web application 112 can use the accessory device 110 specifically to receive input from the accessory device 110.

The difference between the receipt of asynchronous input in part 912 and the receipt of synchronous input in part 920 is as follows. Asynchronous input is received in part 912 specifically each time the accessory device 110 generates such input. That is, as the input is generated at the accessory device 110, the input is immediately sent from the accessory device 110 to the accessory service 120 of the electronic device 106, and then from the accessory service 120 to the web application 112.

By comparison, synchronous is received in part 920 just and particularly in response to the web application 112 having sent a command requesting such input in part 918. The input that the accessory device 110 most recently generated—i.e., the input that was most recently generated at the device 110—is sent by the accessory service 120 of the electronic device 106 to the web application 112. That is, synchronous input is received on a time schedule determined by the web application 112 itself. When the web application 112 wishes to receive input, the web application sends a command in part 918 and responsively receives the input in part 920. By comparison, asynchronous input is received as the input is generated at the accessory device 110.

We claim:

1. A method comprising:
   determining by a web application running on a computing device that an accessory device directly connected in a non-networked manner to an electronic device is to be used during usage of the web application, the computing device connected to the electronic device over a network;
   determining by the web application whether the accessory device has a shared context or an owned context, the shared context specifying that the usage of the accessory device is shared among the web application and one or more other web applications, the owned context specifying that the usage of the accessory device is exclusive to the web application and not to any other web application;
   where the accessory device has the shared context, sending a first command by the web application to the electronic device over the network to reserve temporary exclusive access to the accessory device by the web application; and
   where the accessory device has the owned context, sending an owned registration command by the web application to the electronic device to register the accessory device as having the owned context in relation to the web application.

2. The method of claim 1, further comprising, regardless of whether the accessory device has the shared context or the owned context:
   sending a second command by the web application to the electronic device over the network to begin receiving input from the accessory device;
   receiving input by the web application from the accessory device, via the accessory device sending the input to the electronic device, and the electronic device sending the input to the web application over the network; and,
   sending a third command by the web application to the electronic device over the network to stop receiving the input from the accessory device.

3. The method of claim 2, further comprising, where the accessory device has the shared context:
   sending a fourth command by the web application to the electronic device over the network to release the temporary exclusive access to the accessory device by the web application.

4. The method of claim 1, further comprising, regardless of whether the accessory device has the shared context or the owned context:
   receiving input by the web application from the accessory device in an asynchronous manner, such that each time the accessory device generates the input, the input is immediately sent from the accessory device to the electronic device, and then from the electronic device to the web application over the network.

5. The method of claim 1, further comprising, regardless of whether the accessory device has the shared context or the owned context:
   sending a second command by the web application to the electronic device to receive input from the accessory device in a synchronous manner; and,
   receiving the input by the web application from the accessory device in the synchronous manner via the electronic device, particularly in response to the web application sending the second command to the electronic device.

6. A non-transitory computer-readable data storage medium to store a management computer program executable by a processor of a computing device to perform a method comprising:
   determining by the management computer program that an accessory device directly connected in a non-networked manner to an electronic device is to be used during usage of a web application, the computing device connected to the electronic device over a network;
   where the accessory device has a shared context specifying that the usage of the accessory device is shared among the web application and one or more other web applications, sending a shared registration command by the management computer program to the electronic device, such that in response the electronic device registers the accessory device as having the shared context; and,
   where the accessory device has an owned context specifying that the usage of the accessory device is exclusive to the web application and not to any other web application, sending an owned registration command by the management computer program to the electronic device, such that in response the electronic device registers the accessory device as having the owned context in relation to the web application and sends an event to the web application to notify the web application that the accessory device has the owned context in relation to the web application.

7. The non-transitory computer-readable data storage medium of claim 6, wherein, where the shared registration command specifies the accessory device individually apart from a class of accessory devices including the accessory device, the shared registration command overrules any prior or subsequent shared registration command specifying the class of accessory devices.

8. The non-transitory computer-readable data storage medium of claim 6, wherein, where the owned registration command specifies the accessory device individually apart from a class of accessory devices including the accessory device, the owned registration command overrules any prior or subsequent owned registration command specifying the class of accessory devices.

9. The non-transitory computer-readable data storage medium of claim 6, wherein the web application is a first web application, the owned registration command is a first owned registration command, and the method further comprises:
   after sending the first owned registration command by the management computer program to the electronic device, where the accessory device is subsequently to have the owned context specifying that the usage of the accessory device is exclusive to the second web application and not to any other web application,
   sending a second owned registration command by the management computer program to the electronic device, such that in response the electronic device registers the accessory device as having the owned context in relation to the second web application, sends an event to the first web application to notify the first web application that the accessory device no longer has the owned context in relation to the first web application, and sends an event to the second web application to notify the second web application that the accessory device has the owned context in relation to the second web application.

10. The non-transitory computer-readable data storage medium of claim 6, wherein the web application is a first web application, and the method further comprises:

sending an unregistration command by the management computer program to the electronic device, wherein where the accessory device has the shared context, the electronic device in response to the unregistration command deregisters the accessory device as having the shared context, wherein where the accessory device has the owned context, the electronic device in response to the unregistration command deregisters the accessory device as having the owned context and sends an event to the web application to notify the web application that the accessory device no longer has the owned context in relation to the web application.

11. An electronic device comprising:

a first hardware communication mechanism to communicate with an accessory device directly connectable to the electronic device in a non-networked manner;

a second hardware communication mechanism to communicate with a web application running on a computing device over a network and to communicate with a management computer program running on a same or different computing program; and, an accessory service implemented at least in hardware to permit the web application to use the accessory device and to permit the management computer program to configure the accessory device for use by the web application, wherein the accessory device is configured for use by the web application such that the accessory device has a shared context or an owned context, the shared context specifying that the usage of the accessory device is shared among the web application and one or more other web applications, the owned context specifying that the usage of the accessory device is exclusive to the web application and not to any other web application, wherein where the accessory device has the shared context, the accessory service reserves temporary exclusive access of the accessory device to the web application, and sends input received from the accessory device to the web application over the network until the accessory service has received a command from the web application over the network to release the temporary exclusive access, wherein where the accessory device has the owned context, the accessory service sends input received from the accessory device to the web application over the network.

12. The electronic device of claim 11, wherein the accessory service registers the accessory device so that the accessory device has the shared context, responsive to the accessory device receiving a shared registration command from the management computer program.

13. The electronic device of claim 11, wherein the accessory service registers the accessory device so that the accessory device has the owned context in relation to the web application and sends an event to the web application to notify the web application that the accessory device has the owned context in relation to the web application, responsive to the accessory device receiving an owned registration command from the management computer program.

* * * * *